(12) United States Patent
Fontenot et al.

(10) Patent No.: US 7,571,286 B2
(45) Date of Patent: Aug. 4, 2009

(54) REDUCED MEMORY TRAFFIC VIA DETECTION AND TRACKING OF TEMPORALLY SILENT STORES

(75) Inventors: Nathan D. Fontenot, Cedar Park, TX (US); Jacob Lorien Moilanen, Austin, TX (US); Joel Howard Schopp, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/466,794

(22) Filed: Aug. 24, 2006

(65) Prior Publication Data

US 2008/0052469 A1 Feb. 28, 2008

(51) Int. Cl.
*G06F 12/00* (2006.01)
(52) U.S. Cl. ........................ 711/133; 711/141
(58) Field of Classification Search ............. 711/133, 711/141
See application file for complete search history.

(56) References Cited

U.S. PATENT DOCUMENTS 5,428,761 A * 6/1995 Herlihy et al. ............. 711/130
7,062,638 B2 * 6/2006 Yoaz et al. ................. 712/225
7,076,613 B2 * 7/2006 Peir et al. .................. 711/141

OTHER PUBLICATIONS

Tang, "Selective Invalidation Scheme for Software MP Cache Coherence Control", IBM Technical Disclosure Bulletin, No. 3, pp. 244-246, Aug. 1992.
Garcia et al., "Memory Queue Priority Mechanism for a RISC Processor", IBM Technical Disclosure Bulletin, vol. 37, n6A, pp. 319-322, Jun. 1994.
Lepak et al., "Temporally Silent Stores", ACM Digital Library, Oct. 2002, pp. 1-12.

* cited by examiner

*Primary Examiner*—Kevin L Ellis
*Assistant Examiner*—Hashem Farrokh
(74) *Attorney, Agent, or Firm*—Yee & Associates, P.C.; Matthew W. Baca

(57) ABSTRACT

A computer implemented method, data processing system, and computer program product for reducing memory traffic via detection and tracking of temporally silent stores. When a memory store, comprising an address and a data value, to a cache is detected, a determination is made that a cache line in the cache contains a same address as the address in the memory store. A determination is then made that a tentative cache line invalidate signal for the cache line was previously sent to other data processing systems in the network to tentatively invalidate the cache line. If the memory store is a temporally silent store, a cache line revalidate signal is sent to the other data processing systems to clear the tentative invalidate signal for the cache line.

20 Claims, 3 Drawing Sheets

REDUCED MEMORY TRAFFIC VIA DETECTION AND TRACKING OF TEMPORALLY SILENT STORES

BACKGROUND OF THE INVENTION

1. Field of the Invention

The present invention relates generally to an improved data processing system, and in particular to a computer implemented method, data processing system, and computer program product for reducing memory traffic via detection and tracking of temporally silent stores.

2. Description of the Related Art

With increasing processing demands, many data processing systems now contain multiple processors. With multiple processors, processing tasks may be split up between these processors. Further, these processors may access information that is accessed by other processors within the data processing system.

It is important for each processor in a multi-data processing system to be able to access updated values. At times, it is desirable to know when each processor has access to selected data. Instructions, such as a flush or invalidate instruction, imply that other processors will obtain updated values for information in memory. A flush instruction is an instruction that forces a flush of all changes to memory that are in a cache local to a central processing unit (CPU) into main memory. An invalidate instruction is an instruction that invalidates any cache lines that other CPUs may have that are for the same memory. For example, when data is written to a cache line for a first CPU, an invalidate signal may be sent onto the fabric to the other CPUs in the system which contain a cache line for the same memory. The invalidate signal causes all other CPUs that have the same cache line to flush the cache line to remove the stale value in their cache. After an invalidate instruction, other CPUs will load the updated value from memory, rather than a stale value from the cache. A sync instruction may also be used to ensure that all of the memory store operations have completed.

As discussed by Kevin M. Lepak and Mikko H. Lipasti in *Temporally Silent Stores*, ACM Digital Library, Oct. 2002, pp. 1-12. (hereinafter "Lepak"), the frequently occurring traditionally silent and temporally silent stores may be exploited to reduce memory traffic and improve performance. A traditionally silent store, or a simple silent store, is a store instruction that does not change the value already present at the target memory address. A temporally silent store is a store instruction that changes the value at the target memory address temporarily, and then changes it back to its original value. Traditionally silent stores and temporally silent store can occur frequently. As it has been demonstrated in research, memory addresses that have shown to exhibit temporally silent store behavior in the past tend toward this same behavior in the future (i.e., spin locks which always change the stored value between 0 and 1).

SUMMARY OF THE INVENTION

The illustrative embodiments provide a computer implemented method, data processing system, and computer program product for reducing memory traffic via detection and tracking of temporally silent stores. When a memory store, comprising an address and a data value, to a cache is detected, a determination is made that a cache line in the cache contains a same address as the address in the memory store. A determination is then made that a tentative cache line invalidate signal for the cache line was previously sent to other data processing systems in the network to tentatively invalidate the cache line. If the memory store is a temporally silent store, a cache line revalidate signal is sent to the other data processing systems to clear the tentative invalidate signal for the cache line.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
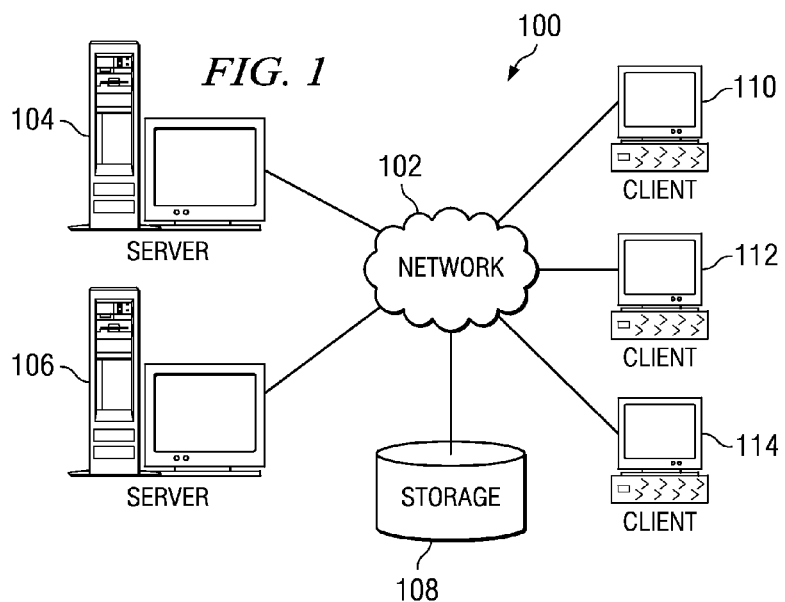
FIG. 1 depicts a pictorial representation of a distributed data processing system in which the illustrative embodiments may be implemented.
Figure 2:
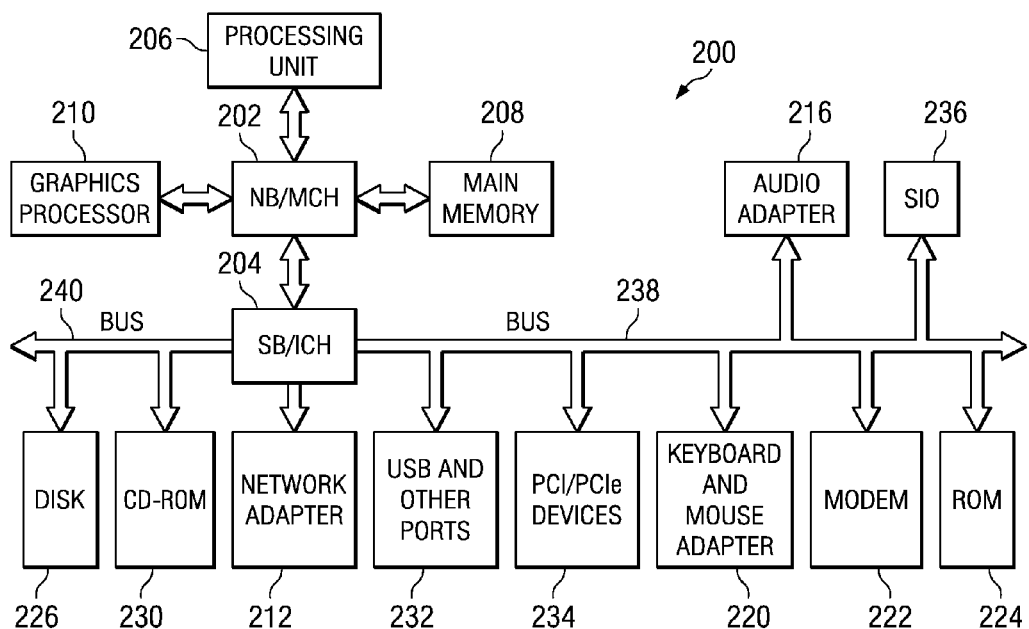
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In the current art, when data is written to a cache line, a cache-line invalidate signal is sent onto the system fabric. The invalidate signal is used to invalidate any cache lines that other CPUs may have that are for the same memory. The invalidate signal causes all other CPUs that have the same cache line to flush the cache line to remove the stale value in the cache. Thus, when a CPU accesses that memory location, the CPU will reload the cache line using the updated value from memory.

The illustrative embodiments provide a solution for cache line flushing for temporally silent stores and traditionally silent stores through the use of a "tentative cache line invalidate" signal. When data is written to a cache line in a particular CPU, a tentative cache line invalidate signal is generated by the CPU. The tentative cache line invalidate signal may be used to inform other CPUs in the system that when they read, write to, or flush the affected cache line, the CPUs may need to perform a full cache line invalidation to invalidate the stale value in their respective cache, and the new value may need to be fetched from the original CPU which sent the tentative invalidate signal.

An advantage of performing a tentative cache line invalidation is that if the original CPU performs a temporally silent store, the tentative invalidation allows one to avoid a potentially unnecessary full cache line invalidation and fetch the cache line from memory. As previously mentioned, a temporally silent store is a store instruction that changes the value at the target memory address temporarily, and then changes it back to its original value. If the original CPU does perform a temporally silent store (i.e., writes the original value back to the cache line), the CPU will send a cache line revalidate signal to the fabric to clear the tentative cache line invalidation signal previously sent. The resulting traffic from the tentative cache line invalidate signal followed by a cache line revalidate signal would be minimal as compared to a full cache line invalidation. In addition, the tentative cache line invalidate and cache line revalidate signals may occur on the CPU bus fabric, as opposed to the much slower memory bus fabric.

Figure 3:
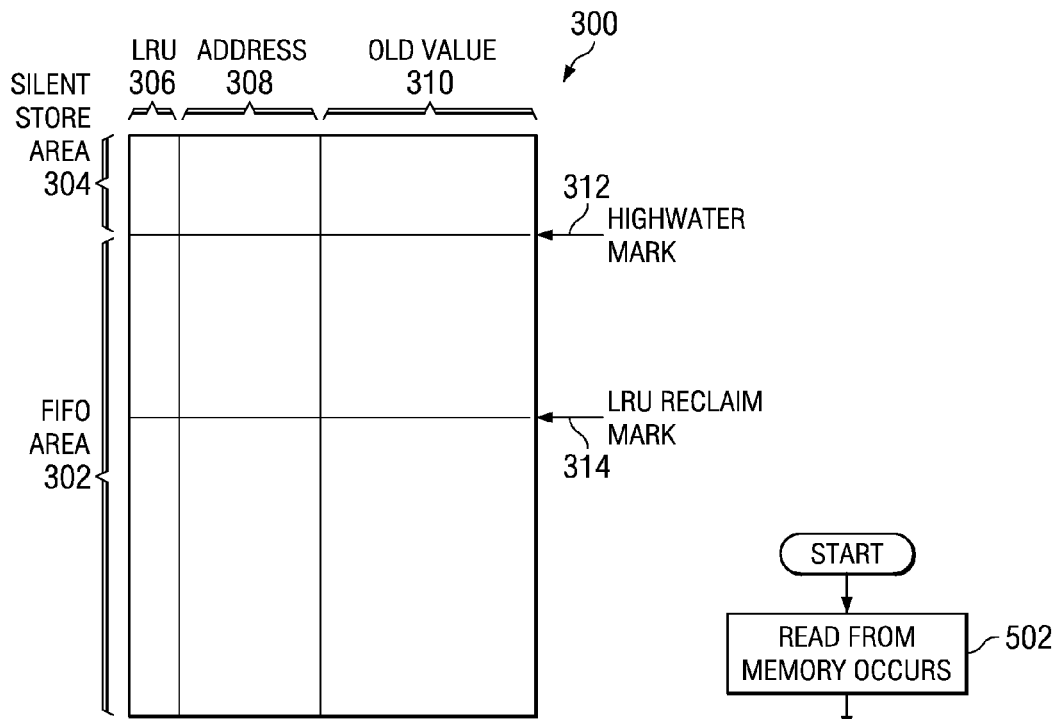
FIG. 3 is a diagram of an exemplary silent store cache in accordance with the illustrative embodiments.

Turning now to FIG. 3, a diagram of an exemplary silent store cache in accordance with the illustrative embodiments is shown. Silent store cache 300 is a cache memory, and may be implemented in data processing system 200 in FIG. 2.

Memory stores to silent store cache 300 are detected and tracked in order to determine when sending a tentative cache line invalidation signal would be beneficial. In addition, memory locations that exhibit temporally silent stores are tracked so that a cache line revalidation signal may be sent when the temporally silent store completes.

In this illustrative example, silent store cache 300 is a single cache divided into two regions: first-in first-out (FIFO) area 302, and silent store area 304. Each memory store entry in silent store cache 300 comprises least recently used (LRU) value 306, address 308, and old value 310. LRU value 306 is a value that reflects how often a memory store is needed. Memory stores that are used least often are discarded from the cache first. Address 308 is the address in silent store cache 300 at which the memory store occurred. Old value 310 is the value of the memory currently stored at address 308.

When a memory store is first seen by silent store cache 300, the memory store comprising address 308 and old value 310 is placed into FIFO area 302. A memory store is 'first seen' by the cache if there is no other entry in silent store cache with the same address 308. A memory store may be moved from FIFO area 302 to silent store area 304 when silent store cache 300 recognizes the memory store as a silent store. A memory store is identified as a silent store when a second memory store at the same address 308 has a value that matches old value 310 stored in FIFO area 302. Once a silent store is detected for address 308, the address (with old value 310 and LRU value 306) is placed in silent store area 304.

When a memory store comprising address 308 and old value 310 is placed in FIFO area 302, the CPU tentatively invalidates address 308 on other CPUs in the system by sending a tentative cache line invalidate signal to the other CPUs in the system. The tentative cache line invalidate signal notifies the other CPUs that if they need to access the cache line, they should perform a full cache line invalidation to invalidate the stale value in their respective caches and fetch the updated value from the original CPU which sent the tentative cache line invalidate signal. Consider the example of address 308 on a CPU, CPU A, which has been modified. If another CPU, CPU B, needs to use the data (read or write), based on the tentative cache line invalidate signal, CPU B will perform a full cache line invalidation to invalidate the stale value in its cache. CPU B will also refetch the updated data from CPU A. However, the tentative cache line invalidate signal also allows CPU A to accommodate temporally silent stores without causing CPU B to unnecessarily perform a full cache line invalidation. Consider again the example above where an address on CPU A has been modified. If the memory store at address 308 on CPU A is a temporally silent store (the data changes back to its old value), CPU A may send a cache line revalidate signal to the other CPUs. The cache line revalidate signal informs the other CPUs that the value they have for address 308 is still valid. Thus, the advantage of using tentative invalidations over full invalidations is the ability to send a revalidate signal after a temporally silent store. By allowing CPU A to revalidate address 308, the other processors do not need to perform a full invalidation, nor do they need to refetch the data already in their caches. Thus, memory traffic and latency are reduced.

FIFO area 302 and silent store area 304 are separated by highwater mark 312 and are maintained in different ways. As memory stores comprising address/value pairs are moved into silent store area 304, highwater mark 312 moves down to accommodate the added silent stores. Conversely, highwater mark moves up as address/value pairs are removed from silent store area 304. Thus, highwater mark 312 provides a dynamic demarcation that supplies an area for tracking incoming memory store operations by cycling them in a first in, first out method (FIFO area 302) and identifying events that cause a full cache line invalidation. In this manner, highwater mark 312 provides the ability to only use as much space in silent store cache 300 as is needed for tracking known silent stores in the silent store area 304.

Within FIFO area 302, LRU reclaim mark 314 may be used to set the limit for the size of silent store area 304. For instance, if a number of silent stores are added to silent store area 304 such that highwater mark 312 moves down to LRU reclaim mark 314, an LRU algorithm may be run to free up entries in silent store area 304. This ability to limit the size of silent store area 304 provides tunable aspects of silent store cache 300, such as how low to set LRU reclaim mark 314, as well as how much cleanup to perform when the LRU algorithm is run.

Figure 4:
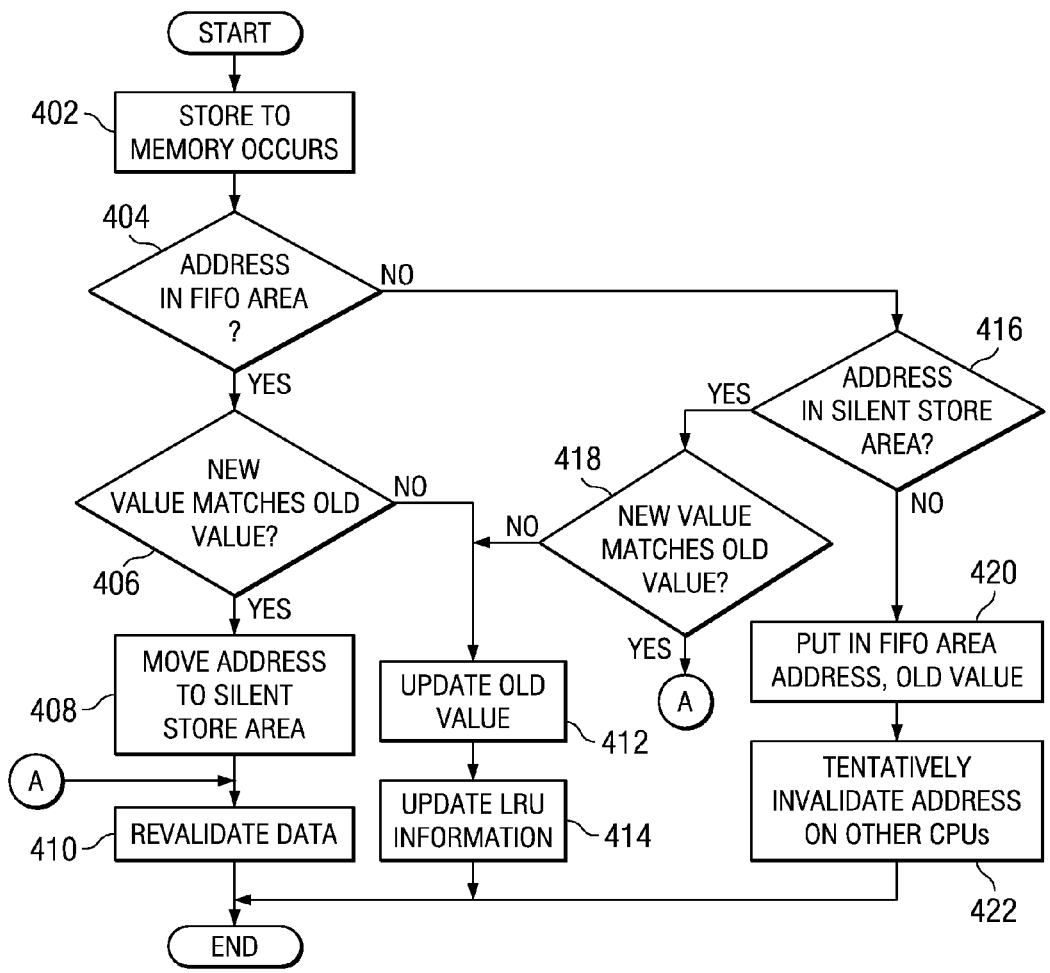
FIG. 4 is a flowchart of a memory store process for detecting and tracking memory stores in accordance with the illustrative embodiments.

FIG. 4 is a flowchart of a memory store process for detecting and tracking memory stores in accordance with the illustrative embodiments. In particular, the process in FIG. 4 allows for determining when a tentative invalidation of data associated with a particular memory address should be sent to other CPUs.

The process begins when a store to memory occurs (step 402). The memory store occurs in a silent store cache, such as silent store cache 300 in FIG. 3. The memory store comprises an address and data value. A determination is made as to whether the address in the memory store is already present in the FIFO area of the silent store cache (step 404). If the address is already present in the FIFO area ('yes' output of step 404), a determination is made as to whether the value in the memory store matches the old value for the address in the FIFO area (step 406). This determination is made to identify whether or not the memory store is a temporally silent store. If the new value in the memory store matches the old value in the FIFO area ('yes' output of step 406), the memory store (address and old value) is moved from the FIFO area to the silent store area (step 408). The CPU then sends a cache line revalidate signal to all other CPUs in the system (step 410). This revalidate signal informs the other CPUs that, since the memory store was identified as a temporally silent store, the data contained in their respective caches has not been changed.

Turning back to step 406, if the new value in the memory store does not match the old value in the FIFO area ('no' output of step 406), the CPU updates the old value with the new value in the memory store (step 412). The CPU then updates the LRU information for the cache entry (step 414), with the process terminating thereafter.

Turning back to step 404, if the address is not present in the FIFO area ('no' output of step 404), a determination is made as to whether the address is present in the silent store area (step 416). If the address is present in the silent store area ('yes' output of step 416), a determination is made as to whether the value in the memory store matches the old value for the address in the silent store area (step 418). If the new value in the memory store matches the old value in the silent store area ('yes' output of step 418), the CPU sends a cache line revalidate signal to all other CPUs in the system (step 410), with the process terminating thereafter.

Turning back to step 418, if the new value in the memory store does not match the old value in the silent store area ('no' output of step 418), the CPU updates the old value with the new value in the memory store (step 412). The CPU then updates the LRU information for the cache entry (step 414), with the process terminating thereafter.

Turning back to step 416, if the address is not present in the silent store area ('no' output of step 416), the memory store (address and old value) is placed in the FIFO area (step 420). The CPU then sends a tentative cache line invalidate signal to other CPUs in the system (step 422), with the process terminating thereafter. The tentative cache line invalidate signal informs the other CPUs that if they access the data at the affected address, the CPUs should fully invalidate their cache and fetch the new value from the original CPU which sent the tentative invalidate signal.

Figure 5:
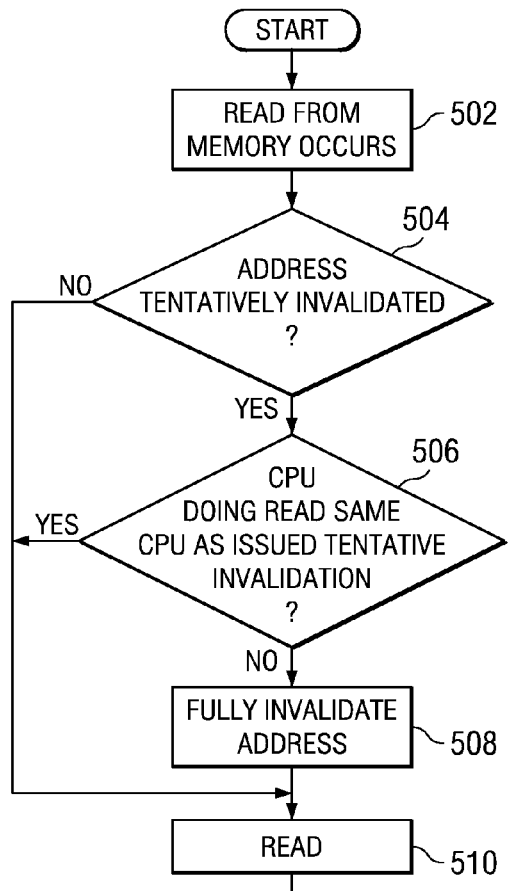
FIG. 5 is a flowchart of a memory read process for tracking memory stores in accordance with the illustrative embodiments.

FIG. 5 is a flowchart of a memory read process for tracking memory stores in accordance with the illustrative embodiments. In particular, the process in FIG. 5 allows for determining when a full cache invalidation should be performed.

The process begins when a read from memory occurs (step 502). A determination is made as to whether the address in the memory read is marked as tentatively invalidated (step 504). If the address is not tentatively invalidated ('no' output of step 504), the memory read is then performed (step 510) using the value present in the cache, with the process terminating thereafter.

Turning back to step 504, if the address is tentatively invalidated ('yes' output of step 504), a determination is then made as to whether the CPU performing the memory read is the same CPU that issued the tentative invalidation (step 506). If the CPU is the same CPU that issued the tentative invalidation ('yes' output of step 506), the memory read is then performed (step 510) using the value present in the cache, with the process terminating thereafter.

Turning back to step 506, if the CPU is not the same CPU that issued the tentative invalidation ('no' output of step 506), the CPU fully invalidates the address (step 508). The CPU then performs the memory read (step 510) by fetching the new value from the CPU that issued the tentative invalidation, with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be a storage medium, such as an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tentatively invalidating and revalidating cache lines, the computer implemented method comprising:
   responsive to detecting a memory store to a cache in a network, wherein the memory store comprises an address and a data value, determining that a cache line in the cache contains a same address as the address in the memory store;
   determining that a tentative cache line invalidate signal for the cache line was previously sent to other data processing systems in the network to tentatively invalidate the cache line; and
   responsive to determining that the memory store is a temporally silent store, sending a cache line revalidate signal to the other data processing systems to clear the tentative invalidate signal for the cache line.

2. The computer implemented method of claim 1, further comprising:
   responsive to determining that the memory store is not a temporally silent store, replacing the data value of the cache line with the data value of the memory store.

3. The computer implemented method of claim 1, wherein the cache line revalidate signal informs the other data processing systems that the data value for the cache line has not changed, prevents the other data processing systems from unnecessarily performing a full cache line invalidation, and prevents the other data processing systems from refetching data already present in their respective caches.

4. The computer implemented method of claim 1, wherein the cache comprises a first in, first out area and a silent store area.

5. The computer implemented method of claim 4, wherein the cache line is located in the first in, first out area.

6. The computer implemented method of claim 4, further comprising:
   responsive to determining that the memory store is a temporally silent store, moving the cache line from the first in, first out area to the silent store area.

7. The computer implemented method of claim 4, wherein the first in, first out area and the silent store area are separated by a highwater mark, and wherein the highwater mark dynamically moves up and down to reflect addition or removal of cache lines in the silent store area to enable the silent store area to occupy only as much space as needed in the cache for tracking silent stores.

8. The computer implemented method of claim 4, wherein a least recently used reclaim mark within the first in, first out area sets a limit for a size of the silent store area.

9. The computer implemented method of claim 1, further comprising:
- detecting a memory read of the cache line in the data processing system;
- responsive to a determination that an address of the cache line is tentatively invalidated, determining that the data processing system performing the memory read is a same data processing system that issued a tentative cache line invalidate signal;
- if the data processing system is the same data processing system that issued the tentative cache line invalidate signal, performing the memory read using the data value in the cache line; and
- if the data processing system is not the same data processing system that issued the tentative invalidation, performing a full cache line invalidate of the address and fetching an updated value from the cache of the data processing system that issued the tentative cache line invalidate signal.

10. The computer implemented method of claim 9, further comprising:
- if the address of the cache line is not tentatively invalidated, performing the memory read using the data value in the cache line.

11. The computer implemented method of claim 1, wherein the tentative cache line invalidate and cache line revalidate signals occur on a bus fabric of the data processing system.

12. A computer implemented method for detecting and tracking memory addresses that exhibit silent stores, the computer implemented method comprising:
- detecting a memory store to a cache in a data processing system in a network, wherein the memory store comprises an address and a data value;
- determining that a cache line in the cache contains a same address as the address in the memory store; and
- identifying the memory store as a temporally silent store if a tentative cache line invalidate signal for the cache line was previously sent to other data processing systems in the network to tentatively invalidate the cache line and the data value of the memory store matches a data value of the cache line.

13. A data processing system for tentatively invalidating and revalidating cache lines, the data processing system comprising:
- a bus;
- a storage device connected to the bus, wherein the storage device contains computer usable code;
- at least one managed device connected to the bus;
- a communications unit connected to the bus; and
- a processing unit connected to the bus, wherein the processing unit executes the computer usable code to determine, in response to detecting a memory store to a cache in the data processing system in a network, wherein the memory store comprises an address and a data value, that a cache line in the cache contains a same address as the address in the memory store; determine that a tentative cache line invalidate signal for the cache line was previously sent to other data processing systems in the network to tentatively invalidate the cache line; and send a cache line revalidate signal to the other data processing systems to clear the tentative invalidate signal for the cache line in response to determining that the memory store is a temporally silent store.

14. A computer program product for tentatively invalidating and revalidating cache lines, the computer program product comprising:
- a computer usable storage medium having computer usable program code tangibly embodied thereon, the computer usable program code comprising:
- computer usable program code for determining, in response to detecting a memory store to a cache in a data processing system in a network, wherein the memory store comprises an address and a data value, that a cache line in the cache contains a same address as the address in the memory store;
- computer usable program code for determining that a tentative cache line invalidate signal for the cache line was previously sent to other data processing systems in the network to tentatively invalidate the cache line; and
- computer usable program code for sending a cache line revalidate signal to the other data processing systems to clear the tentative invalidate signal for the cache line in response to determining that the memory store is a temporally silent store.

15. The computer program product of claim 14, further comprising:
- responsive to determining that the memory store is not a temporally silent store, replacing the data value of the cache line with the data value of the memory store.

16. The computer program product of claim 14, wherein the cache line revalidate signal informs the other data processing systems that the data value for the cache line has not changed, prevents the other data processing systems from unnecessarily performing a full cache line invalidation, and prevents the other data processing systems from refetching data already present in their respective caches.

17. The computer program product of claim 14, wherein the cache comprises a first in, first out area and a silent store area.

18. The computer program product of claim 17, further comprising:
- responsive to determining that the memory store is a temporally silent store, moving a cache line located within the first in, first out area to the silent store area.

19. The computer program product of claim 17, wherein the first in, first out area and the silent store area are separated by a highwater mark, and wherein the highwater mark dynamically moves up and down to reflect addition or removal of cache lines in the silent store area to enable the silent store area to occupy only as much space as needed in the cache for tracking silent stores.

20. The computer program product of claim 17, wherein a least recently used reclaim mark within the first in, first out area sets a limit for a size of the silent store area.

* * * * *